July 8, 1969 E. HERTER 3,454,724

KEY CONTROLLED DIRECT CURRENT SIGNALLING SYSTEMS

Filed May 11, 1965

United States Patent Office 3,454,724
Patented July 8, 1969

3,454,724

KEY CONTROLLED DIRECT CURRENT SIGNALLING SYSTEMS

Eberhard Herter, Stuttgart, Germany, assignor to International Standard Electric Corporation Filed May 11, 1965, Ser. No. 454,877
Claims priority, application Germany, May 20, 1964, St 22,140
Int. Cl. H04m *1/28*
U.S. Cl. 179—84 2 Claims

ABSTRACT OF THE DISCLOSURE

Key controlled direct current signalling systems having switching elements that use an armature that is common to two sets of contacts. One set of contacts is used for opening the loop to signify initiation of signalling. The other set of contacts which can only be operated to the closed position by the common armature after it has opened the first set of contacts provides the actual signals. Thus, there is no possibility of signalling without opening the loop, or opening the loop without signalling.

Figure 1:
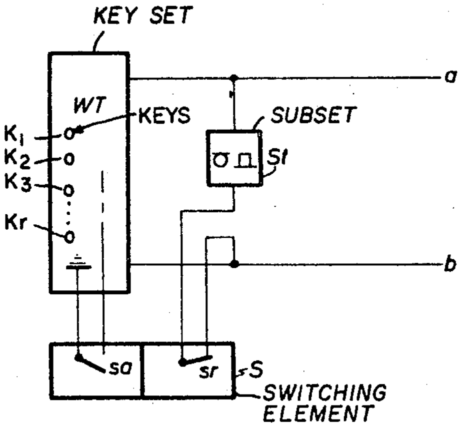

The invention relates to telephone systems and more particularly to asymmetrical direct current signalling systems over two-wire telephone lines as used, for example, in key-dialling between the subscriber station and the exchange office for the transmission of the dialling signals. The asymmetrically formed code signals are thereby evaluated in two interrogating steps of different current directions.

A problem in this direct current key dialling method is the proper identification of the keying criteria on the receiving end. The known signalling methods choose loop interruption on the transmitting end as a keying criterion. The criterion is evaluated at the receiving station and thereafter the interrogation is initiated. The loop interruption is registered in the receiving facility as current drop in one wire and can also be caused when ground is applied to one of the conductors although the loop has not yet been interrupted. This can result in a faulty evaluation of the signals at least in the first interrogating step. Thus, when, in the signalling code in the first interrogating direction, only grounding of one wire is provided, the code element "both wire grounded" is registered. In order to avoid this difficulty another known signalling system provides resistors in the signalling circuit of the transmitting station, so that when a direct ground is applied to the wires the evaluating device for the keying criterion does not respond. It is thereby assured that normally the evaluation is initiated only when the loop is interrupted, however, the sensitivity against trouble in signalling caused by interferring voltages is increased, due to the subdivision of the current on both wires.

Known systems are characterized in that the identification of the keying and the starting signal for the evaluation are performed separately. The key-pressing identification is carried out in the well known method of current reduction in one wire. The voltages of the wire to ground and wire to wire influence a coincidence circuit which furnishes the starting signal for evaluation when one or several signalling conditions, given by the non-signalling condition, do not appear. With the inventive system no erroneous dialling by differing closing periods of the contacts is possible, and nevertheless ground can be applied onto the subscriber station without a series resistor, so that higher interfering voltages can be tolerated without causing trouble in signalling.

All signalling systems discussed above use the criterion "loop interruption" on the sending end to indicate the start of signalling. A problem due to this criterion is when a connection is established, an erroneous keying can open the connection. The dial receiving facility which could discern said condition from the release is not then connected with the line. A feeding element should be provided with additional switching means to secure the establishment of the call, which means could also discern between the release and the operative condition.

The known systems with separation of keying identification and starting signal for the evaluation has another drawback. That is, when the key is pressed down only halfway the keying identification criterion can be evaluated although the starting signal does not appear. If the feeding repeater is only equipped with a facility to identify a keying and the centralized dial receiving facility is seized. This seizure is useless until the starting signal for the evaluation appears. In order to avoid this useless seizure it would be necessary to provide on the transmitting end, expensive key sets with snap-keys, or to equip the repeaters with the facilities to receive the starting signal for evaluation. Both possibilities would essentially increase the costs for such signalling systems.

Accordingly, it is an object of this invention to provide new and unique asymmetrical direct current, key actuated, signalling systems.

Another object of the invention is to provide asymmetrical direct current signalling systems that are highly impervious to interfering voltages.

More specifically, an object of the present invention is to provide a clear and definite keying criterion without reducing the asymmertical signalling currents.

A still further object of the invention is to avoid all of the problems of the known systems and to provide an asymmetrical direct current signalling system, particularly for key dialling, which prevent an erroneous dialling, without the mechanically complicated snap-type keys, through a slow actuation of the keys. The asymmertical direct current signalling for two-wire telecommunication lines, particularly for the key dialling equipment utilizing telephone subscriber lines, according to the invention, is characterized in that on the transmitting end a bistable switching element is provided through which in non-operative signalling condition the loop circuit is closed and the control potential is disconnected from the dialling keys, and in case the keys are actuated the loop circuit is interrupted and the control potential applied to the dialling keys.

The bistable switching element utilizes a common armature element which assures that no time elapses between the loop interruption and the signal control potential becoming effective. Both switching conditions on the transmitting end are thus clearly separated from each other and change compulsorily. According to an embodiment of the inventive system only one common bistable switching element is provided which is actuated by a mechanically and/or magnetically coupling element, controlled by all keys of the dialling key set. The coupling elements can be made to any construction known to the art. The inventive system is not influenced by the coupling used, therefore, the construction of the coupling elements will not be described in detail.

The bistable switching element is actuated only when the contacts of the dialling keys are closed. There are also cross-point key sets known in which for each key a row and a column cross-point element actuate the contacts required to form the code signal. A suitable embodiment of the inventive system provides a bistable switching element associated with each column in a cross-point keying set. The same functions are performed by all bistable switching elements.

In this manner, the cross-point elements of the dialling key set are also used for actuating the bistable switching elements. When a key set is provided in which the keys have individual contacts, preferably reed contacts, the key set is chosen so that a bistable switching element is associated with each key of a key set, that the same functions are preformed by all bistable switching elements, and that the outputs of the bistable switching elements are also used to form the signals.

To realize the inventive system in its simplest embodiment, a bistable switching element is provided that uses a ball-type reed contact with separate break and make contacts. The ball-type common armature contact can be switched through a permanent magnet. Thus, there is provided at the keying shaft a simple bistable switching element which transmits from the stable non-operative condition into the stable operative condition with a practically negligible switch-over time. The break contact is used to interrupt the loop and the make contact is used to apply the control potential to the dialling key set. When using a ball-type common armature contact, having on the working end three contact springs and twin make contacts the signalling can be made, when providing such a contact for each key, in that via the first make contact the code elements for both wires can be connected, and via the second make contact the control potential is applied to the prepared signalling combination. The break contact of the ball-type armature contact thereby interrupts the loop when the key is pressed.

Figure 2:
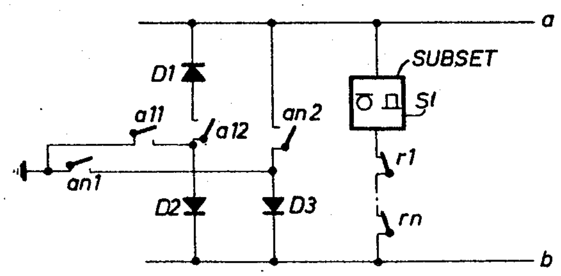
Figure 3:
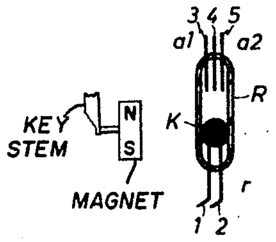

The above mentioned and other features of this invention and the manner of obtaining them will become more apparent, and the invention itself will be best understood by reference to the following description of an embodiment of the invention taken in conjunction with the accompanying drawings, in which:

FIG. 1 shows a functional block diagram to explain the signalling method according to the invention; and FIG. 2 shows an example of the bistable switching elements utilized with ball-type armature contacts; and FIG. 3 shows such a ball-type armature contact.

FIG. 1 shows the transmitting station for the signalling method in principle. When the transmitting station is a telephone subset the connecting line *a, b,* lead to the telephone exchange. The conventional station circuitry, such as speech and audio circuit, as well as the ringing element are represented simplified as a circuit S*t*.

The loop is closed by the cradle switch contact known to the art. A break contact *sr* of the bistable switching element S is inserted into the loop circuit. When an asymmetrical direct current signalling method is used, the code signals are formed in that the wires are not directly or are not connected through a rectifier in one or the other current direction with the control potential, i.e. with ground. This selection of the code signal is performed by the dialling key set WT. When conventional keys for that set are provided the above mentioned difficulties arise in that by closing of the contacts at different times an erroneous dialling is possible, when the keys are actuated too slowly. For example, the contacts of the dialling keys can be closed while the contact used to interrupt the loop is still closed, too. In order to prevent such possibilities of erroneous dialling the invention provides that the control potential is applied to the dialling key set WT only when the loop is safely interrupted. Connection via the contact *sa* of the bistable switching element S enforces this transition in a simple way.

FIG. 2 shows an example of the invention wherein a ball-type armature contact is provided for each dialling key. The ball-type armature contact is actuated magnetically in a well known manner. The ball type armature contact possesses, as shown in FIG. 3, a separate break contact *r,* formed by the contact springs 1 and 2. In the operative position the ball K inserted in the glass tube R connects the three contact springs 3, 4 and 5.

The connection of the contact springs 3 and 4 represents a make contact *a*–1 and the connection of the contact springs 4 and 5 respresents a make contact *a*–2. The contact spring 4 is common to both make contacts.

FIG. 2 shows how, with the aid of such a contact, the bistable mode of action is obtained on the station end. The separate break contacts *r*–1 to *r*–*n* of the dialling keys form a contact chain, whereas the pertinent make contacts *a*–11, *a*–12 to *a*–*n*1, *a*–*n*2 form the code signals and provide application of the control potential. When the key associated with the bistable switching element *a*–11, *a*–12, *r*–1 is actuated, the loop is interrupted through contact *r*–1. Contact *a*–12 determines the signalling combination, e.g. connection of the diodes D1 and D2 to both wires, whereas contact *a*–11 simultaneously applies the control potential. The conditions are similar for each dialling key; if the key, associated with the bistable switching element *an*–1, *an*–2, *r*–*n* is actuated, the loop is interrupted through contact *r*–*n* and the signal combination "*a*-wire directly grounded" and "*b*-wire grounded via rectifier D3" is formed through contact *an*–2 and supplied with control potential through contact *an*–1. The advantages of the invention are obtained, when the bistable mode of operation is introduced for facilities which interrupt the loop circuit and apply control potential to the dialling key set. It is of little significance whether the bistable switching facility operates electromagnetically or fully electronically.

While the principles of the invention have been described above in connection with specific apparatus and applications, it is to be understood that this description is made only by way of example and not as a limitation on the scope of the invention.

I claim:

1. An asymmetrical key set controlled direct current signalling system for signalling through two wire telecommunication lines from calling station to a called station, said key set comprising bistable switching means associated with each key of said key set, said bistable switching means comprising a pair of normally closed contacts, means including said closed contacts serially connected for closing a loop circuit extending between said two wires, said bistable switching means further comprising normally open contact means, common armature means normally closing said closed contact means and used in making said open contact means, and means responsive to the operation of the keys of the key set for moving said common armature means of the associated bistable switching means to open said normally closed contacts to interrupt the loop circuit and to close said normally open contacts to selectively apply ground potential over said two wires through said normally open contacts to form coded signals.

2. A signalling system for transmitting asymmetrical direct current supervisory signals over telephone lines from calling station to a called station, said telephone lines consisting of two wire lines, a dialing key set associated with each of said stations, a bistable switching element operatively associated with each of the keys of said key sets for opening the line loop from the calling station to the called station and for thereafter selectively coupling said lines to potential sources to transmit signals from the calling station to the called station, said bistable switching element comprising separate break contacts and separate make contacts, said break contacts being serially connected for completing the line loop through each of said stations, said bistable switching element comprising a ball-type armature common to both said break contacts and said make contacts and said armature operated responsive to the operation of said associated key to open said break contacts and to close said make contacts, said ball-type armature contact being operated by a permanent magnet arranged at the shaft of the individual keys, said make contacts comprising three contact springs forming first and second make contacts, said first make contacts being used for connecting code elements for both of said lines, and said second make contacts being used for connecting said potential sources to selected ones of said code elements to provide a prepared signalling combination.

References Cited

UNITED STATES PATENTS

| | | | |
|---|---|---|---|
| 3,261,942 | 7/1966 | Wessel | 335—154 |
| 3,319,010 | 5/1967 | Franchi. | |

KATHLEEN H. CLAFFY, *Primary Examiner.*

W. A. HELVESTINE, *Assistant Examiner.*

U.S. Cl. X.R.

179—90